350-312.  SR
10-05-71  OR  3,610,740

United States Patent

[11] 3,610,740

| [72] | Inventor | Luis R. Aparicio<br>Avda, Jose Antonio 57, Madrid 13, Spain |
|---|---|---|
| [21] | Appl. No. | 765,287 |
| [22] | Filed | Oct. 7, 1968 |
| [45] | Patented | Oct. 5, 1971<br>Continuation-in-part of application Ser. No. 410,049, Nov. 5, 1964, now abandoned. |

[54] VARIABLE LIGHT FILTERS
9 Claims, 15 Drawing Figs.

[52] U.S. Cl. .................................................. 350/312,
350/278, 351/44
[51] Int. Cl. .................................................. G02b 5/24
[50] Field of Search .................................................. 350/159,
278, 312; 351/44, 47

[56] References Cited
UNITED STATES PATENTS

| 2,085,190 | 6/1937 | Gretenev et al. ............. | 350/312 |
| 2,433,456 | 12/1947 | Jansen ............................. | 350/312 X |
| 2,537,011 | 1/1951 | Aparicio ......................... | 350/312 UX |
| 3,198,670 | 8/1965 | Platzer ............................ | 350/278 X |
| 3,371,979 | 3/1968 | Cutanzaro ....................... | 350/159 X |

FOREIGN PATENTS

| 530,375 | 9/1956 | Canada ........................... | 351/44 |
| 584,450 | 10/1959 | Canada ........................... | 350/312 |
| 766,287 | 1/1957 | Great Britain ................. | 350/312 |

Primary Examiner—David Schoenberg
Assistant Examiner—John W. Leonard
Attorney—George H. Mitchell, Jr.

ABSTRACT: A variable light filter comprises a fluid filled cavity having opposed transparent walls with a prismatic member movable in the cavity for varying the thickness of a light modifying fluid interposed in the optical path between the transparent walls, the control for the prismatic member including an element movable in the cavity without causing any displacement of the total volume of said fluid.

INVENTOR
Luis Rodríguez Aparicio

George H. Mitchell, Jr
ATTORNEY

INVENTOR
Luis Rodríguez Aparicio

ATTORNEY

INVENTOR

Luis Rodríguez Aparicio

ATTORNEY

INVENTOR
Luis Rodríguez Aparicio

ATTORNEY

INVENTOR
Luis Rodríguez Aparicio

ATTORNEY

FIG. 15

VARIABLE LIGHT FILTERS

This application is a continuation-in-part of my copending application Ser. No. 410,049, filed Nov. 5, 1964.

This invention is a novel variable light filter whose absorption or filtering action can be varied in order to satisfy any filtering necessity, and it is particularly useful as a regulator of luminous intensity, on being applied as a window for any type of vehicle, or building for spectacles, optical filters for photography, television, light projectors, or the like.

Conventional light filters possess a permanent filtering characteristic. Therefore, the intensity of the radiation or the spectral quality of the same, transmitted through them, cannot be modified, for which reason such filters must be eliminated when filtering action is not desired, or substituted by others when one wishes to increase or decrease the optical density of the filtering, or to vary the spectral characteristic of the radiation.

A variable filter designed to solve the inconveniences or fixed light filters and to give variable filtering action was described and claimed in my prior U.S. Pat. Nos. 2,474,712 and 2,537,011 and in their corresponding foreign patents. This variable filter was constituted by two rigid members, transparent and parallel, assembled in such a way that they could move to separate themselves from each other or to approach each other. Between these members there existed a film or layer of adequate filtering fluid whose thickness could be varied. The filtering fluid was supplied by a deformable tank in direct communication with the edges or periphery of the transparent members. The transparent members were forced to establish contact due to the action of surrounding pressing mediums. When the transparent members reached their maximum proximity to each other, the filter possessed it minimum absorption. When the tank was compressed, the filtering fluid was forced between the transparent mediums. By regulating the compression of the tank it was possible to introduce between the transparent mediums with any thickness desired of the layer of fluid, and therefore obtain any degree of filtering action desired.

However, the variable filter described in the aforementioned patents suffered from inconveniences which limited its use. Thus, for example, the necessity of using pressure, both to introduce the filtering fluid between the transparent mediums and to evacuate it and return it to the tank, created problems of airtightness. This pressure forced the liquid to diffuse itself through the walls of the tank which, since they were made of vary flexible material were naturally porous. The filter was affected by the force of gravity, for which reason it could generally only work correctly in one position. It was also affected by any vibration, acceleration, deceleration, centrifugation, or the like, due to the fact that the mass of fluid contained between the transparent walls could move freely between the same. Its absorption value could be also affected on placing any pressure on the transparent members, and hence the uniform sharing of the absorption value over the whole area of its surface was difficult to achieve.

According to the present invention, the limitations and objections as regards conventional filters, as well as the variable filter described in the aforementioned patents, are solve, offering a filter with variable optical density of easy construction and stable performance. Any percentage whatever of radiation from a source of determined intensity can be made to pass through the filter, since the percentage can practically be regulated between the limits of opacity and transparency, a reason for which the filter can be installed in a permanent manner in the path of the radiation.

Generally, my present invention consists of a box or receptacle, airtight, rigid and flat, whose cavity has a prismatic form with permanent dimensions, built in such a way that its two sides of greater surface are made of transparent material and these two sides constitute the faces of the filter. The inner surfaces of these two transparent walls are not parallel, but form a very acute or sharp angle with each other so that the cavity limited by these walls has the form of a trapezoidal or trapezial prism. With the aforementioned cavity, a transparent member is lodged whose shape and measurements are adapted to the shape and measurements of the cavity, almost totally filling it. This transparent member thus has a wedge-shaped form, but this wedge, on its thicker part, is somewhat of less height than the cavity wherein it is lodged, in such a way that the cavity is not entirely filled by the transparent member or wedge. The entire volume of the cavity not filled by the transparent member or wedge is occupied by a filtering fluid.

If the wedge is shifted within the cavity towards the portion of cavity occupied by the filtering fluid the wedge will cease its contact with the transparent walls of the cavity, forming a space or separation between the wedge and the transparent walls of the filter, whereupon filtering fluid will immediately occupy that space or separation, as the movement of the wedge will dislodge the fluid from its normal location at the bottom of the cavity. The filtering fluid, on filling the space or separation produced between the wedge and the transparent walls of the filter, wills will form a film or filtering layer whose thickness will be proportional to the angular value of the wedge and to its movement. The thickness of the film or filtering layer can be calculated by means of the following equation: $B=(A-a/L) \times D$
in which "B" represents the thickness of the film or layer of filtering fluid, "A" the thickness of the wedge on its thickest side, "a" the thickness of the wedge on its narrowest side, "L" the height of the wedge, and "D" the movement of the wedge in the interior of the cavity. The variations in thickness of the film give variations of absorption. The absorption will logically be proportional to the thickness of the film. When the wedge is moved in the reverse direction so as to contact or fit between the transparent walls of the filter, the layer of fluid lodged between the wedge and the transparent walls is evacuated, occupying the space left by the wedge on moving. The filter will possess its minimum absorption when the wedge is so inserted between the transparent walls as to establish contact with the interior faces of the same, because, in this position, the thickness of the film of filtering fluid contained between the wedge and the transparent walls of the filter will be practically nil.

Lastly, the filter cavity may be provided with an airtight bladder, containing air, or otherwise designed to provide a yieldable body whose purpose is to compensate for the volumetrical variations of the liquid produced by changes of temperature. This bladder can be lodged in any part of the cavity in such a way that the volumetrical expansions and contractions of the liquid may act on it.

The objects, characteristics and benefits of the present invention will be better understood on examining the accompanying drawings, whose description follows. In said drawings.

Figure 1:
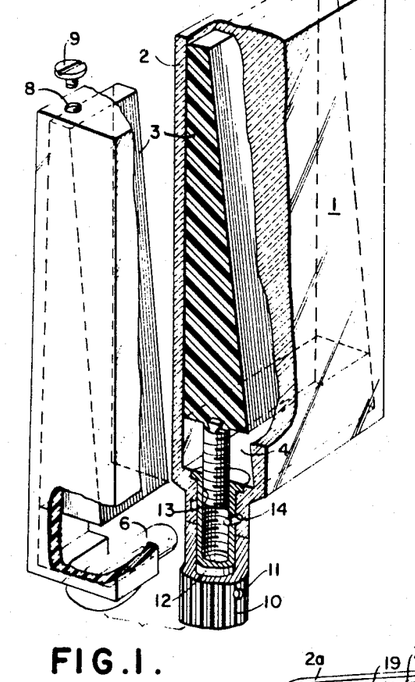
FIG. 1 is a fragmented perspective view of a simplified form of the filter, in which the casing which constitutes the same is totally constructed of transparent material, and showing the wedge in the position which it occupies when the filter possesses minimum absorption.
Figure 2:
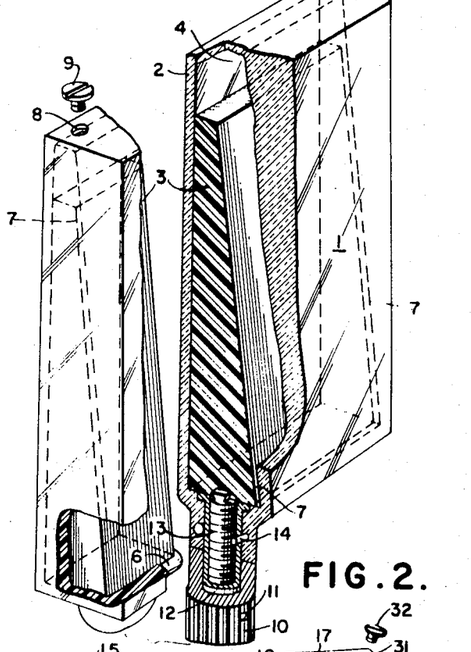
FIG. 2 is the same fragmented perspective view of the simplified construction of the filter illustrated in FIG. 1, but showing the wedge in the position which it occupies when the filter possesses maximum absorption.

The variable light filter shown in FIGS. 1 and 2 consists of two rigid and transparent members 1 and 2, of glass, plastic, or any other adequate transparent material, which possesses very low absorbing characteristics and sufficient hardness and thickness to prevent deformation. Referring to the simplified form shown in FIGS. 1 and 2, these two transparent members 1 and 2 constitute the walls of an airtight box, all parts of which are formed of the same material. The inner surfaces of the walls 1 and 2 are inclined to each other, and thus the cavity formed between them is of prismatic shape.

Almost totally filling this cavity is a third transparent member 3 formed of glass, plastic or any other rigid material with a very low absorbing value, and also of prismatic shape, which we will hereinafter call a wedge. The height of the wedge 3 is, as can be seen in FIGS. 1 and 2, less than that of the cavity 4, so that approximately 10 percent of the cavity 4 remains unfilled by the wedge 3 when the latter is inserted between the transparent members 1 and 2, as illustrated in FIG. 1.

The thickness of the wedge 3 is about 0.1 mm. less than the separation existing between the transparent walls 1 and 2, when the wedge is inserted between the said walls, that is, when it occupies the position illustrated in FIGS. 1, 3, 4, 5, 6 and 8. This difference between the thickness of the wedge 3 and the distance between the transparent walls 1 and 2 is necessary in order to provide for a fine film of fluid between the wedge 3 and the walls 1 and 2, the purpose of this film being to prevent the phenomena of molecular tension from establishing a strong adhesion between the wedge 3 and the interior surfaces of the walls 1 and 2, and furthermore to prevent excessive rubbing between the surface which could damage the latter. The thickness of this film can be reduced in the case of using an absorbing liquid with very low viscosity, or when the filter has small dimensions. On the contrary, it must be increased when the viscosity of the filtering fluid is very high or when the dimensions of the filter are large. The width of the wedge 3 is slightly less than that of the cavity, also for the purpose of providing free and easy movement of the wedge therein. The difference in width between the wedge 3 and the cavity 4 is only that necessary to prevent rubbing.

Occupying a small part of the cavity 4 and situated at a location which does not interfere with the free movement of the wedge 3 may be a bladder or receptacle 6 which is airtight, flexible and full of air. This bladder or receptacle 6 can be formed of rubber, synthetic rubber, polythene, polyvinyl chloride, corrugated metal, or the like, or of any other flexible or elastic material, so that its volume can be slightly increased or decreased without appreciable force. The bladder or receptacle 6 is full of air at normal atmospheric pressure, and it represents an air bubble in the interior of cavity 4. The rest of the cavity 4, not occupied by the wedge 3 and the bladder or receptacle 6, is filled preferably with filtering fluid, at the lowest temperature at which the filter has to work, through the holes 8, situated at any point of the filter periphery or near the latter, said hole 8 being hermetically closed by means of a screw 9, once the filter 4 is full.

Every increase in temperature, from the minimum to that at which the filter has been filled with the filtering fluid, will produce a corresponding volumetrical expansion of the fluid and will compress the air bubble contained in the interior of the bladder or receptacle 6, reducing the dimensions of the same. The size of the bladder or receptacle, and therefore that of the air bubble contained in the interior of the same, will depend on the volumetric dilation coefficient of the liquid, on the maximum temperature at which the filter must work, and on the amount of fluid contained in the interior of the filter.

The transparent member or wedge 3 can move freely within the interior of the cavity 4 of the filter, in parallel movement to the sides which constitute the base of the prism, or in the vertical direction of the cavity 4.

In FIG. 1 the moveable member or wedge 3 is represented as adjusted, inserted or wedged between the transparent members of walls of the filter 1 and 2. It is in this position that the film or filtering layer of fluid existing between the movable wedge 3 and the walls of the filter 1 and 2 possesses a minimum thickness which, as was said previously, is only 0.1 mm. approximately. Such a reduced thickness of the filtering layer does not produce appreciable absorption effects. When the movable wedge 3 is moved or adjusted vertically downwardly parallel to the two bases of the prism towards the part of the cavity 4 full of filtering fluid, the layer of filtering fluid progressively increased in thickness and will reach its maximum value, and therefore its maximum absorption values when the movable wedge 3 reaches the lower end of its travel in the aforementioned direction, i.e., in the position illustrated in FIG. 2. In this situation, all the fluid, displaced by the wedge 3 when the latter occupies the place normally occupied by the fluid, will for the most part situate itself in the crevice or space formed between the movable wedge 3 and the wall 1 of the filter forming the absorbent layer 7 shown in FIG. 2. The absorbent layer 7 can in fact be formed not only between the movable wedge 3 and the wall 1 of the filter, but also between the movable wedge 3 and the wall 2 of the filter, and at the same time between both sides of the wedge 3 and both transparent members 1 and 2. In any case, the absorption value or optical density of the filter will be the same, since this value will always depend on the sum of the thickness of the layers formed on one or the other or on both sides of the sliding wedge 3. For simplicity, in FIG. 2 only one layer 7 of substantial thickness has been represented between the wall of the filter and the sliding wedge 3.

In the simplified form of the invention illustrated in FIGS. 1 and 2, the movement of the wedge 3 is effected by means of a screw system. It can be seen in these figures that on rotating the knob 10, fixed on the tapped member 12 by means of the setscrew 11, the screw 13 which engages the tap of member 12 may be moved. This screw 13 is in turn fixed to the wedge 3 and consequently its movement is transmitted to the wedge. Tapped member 12, as shown, is rotatably mounted in a tubular projection forming an extension of the cavity extending from the bottom of the filter adjacent its center, and is internally threaded to engage the threads of the nonrotatable screw 13. In order to assure the airtightness of the cavity of the filter, a gasket 14 has been provided which places pressure on the member 12 and on the walls of the projection where the latter is lodged.

In order that the two exterior faces of the filter may be parallel, the wall or transparent member 1 of the filter, and the adjacent wall of the movable wedge 3, has a prismatic form. This structure for one of the transparent members of the filter is only necessary in cases where the application of the filter might demand a minimum refraction value, but in the application of the invention to windows, finders, antiglare screens, and the like, the transparent member 1, like member 2, can have parallel walls, just as is illustrated in FIGS. 3, 4, 5, 6 and 8, because due to the extremely sharp angle of the wedge 3 or, what amounts to the same, of the prism formed by the ensemble, the phenomenon of refraction which may be produced is negligible.

Figure 3:
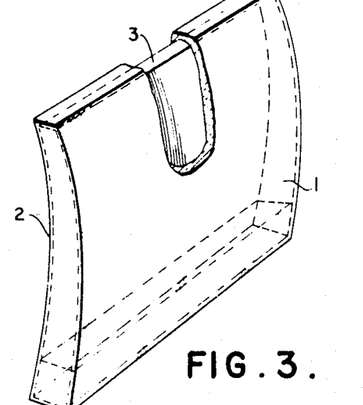
FIGS. 3, 4 and 5 show diagrammatic views of several shapes of filter according to the present invention.
Figure 4:
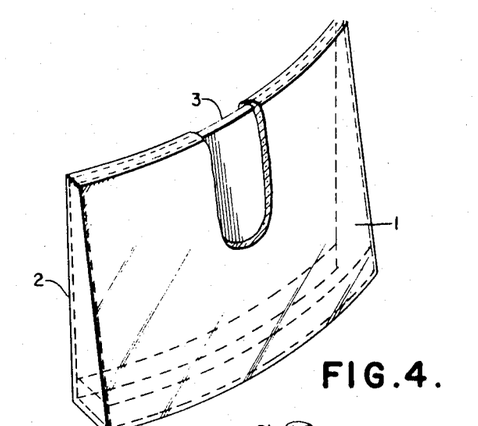
Figure 5:
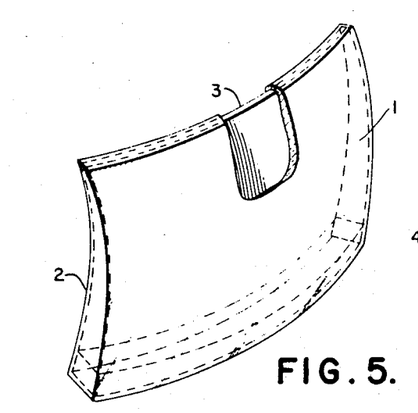

The cavity 4 of the filter, the same as the wedge 3 lodged in it, has, as has already been said, the shape of a prism. This prism and wedge is not necessarily limited to flat surfaces, but can be adapted to curved or spherical shapes, if the constructive necessities thus demand it. FIG. 3 represents a filter wedge and cavity with curved walls in the vertical direction of the wedge. FIG. 4 represents a filter cavity and wedge with walls curved in the horizontal direction of the wedge; and FIG. 5 represents a filter cavity and wedge with spherical walls. In these three figures, 1 and 2 represent the faces of the filter and 3 the sliding wedge.

Figure 6:
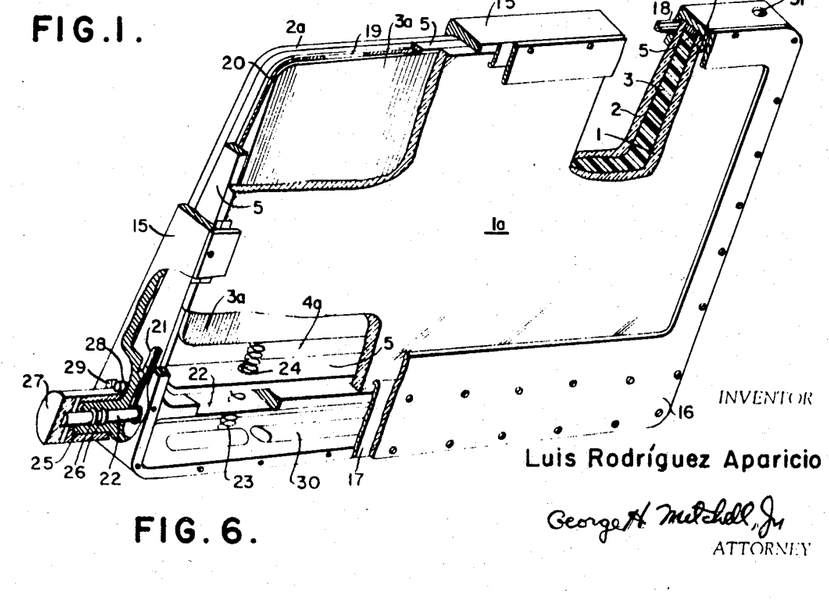
FIG. 6 is a fragmented perspective view of another modification of the variable filter, applicable to rectangular openings, such as windows.

FIGS. 1 and 2 represent, as was said, a simplified form of the variable light filter, an object of the present invention, but in view of the generality of applications of the invention, its construction may require in addition other elements such as those in FIG. 6, which refers to a window, antiglare screen or similar application. In this modification, as in any other, the filter consists of two rigid and transparent members 1a and 2a. Surrounding the edges or periphery of the members 1a and 2a, is a rigid frame 15 which acts as a stand for the filter, and its purpose is to keep the components of the filter joined together in their correct position, to house the control elements of the filtering action, to provide the necessary airtightness to prevent any escape of the filtering fluid contained in the interior of the filter. The transparent members 1a and 2a are separated from each other by means of a separating member 5 formed of rigid material such as metal, bakelite, hard plastic, or the like. The purpose of this separating member 5 is that of keeping the transparent members 1a and 2a in spaced relation and at a distance from each other which is adequate and invariable. Moreover, member 5 establishes between the walls 1a and 2a, a prismatic shaped cavity 4a, with permanent dimensions. The rigid frame 15 joins and compresses together the transparent member 1a, the separating member 5, and the transparent member 2a, when the cover 16 is properly screwed or fixed to the aforementioned frame 15. The airtightness of the cavity 4a thus formed is obtained by means of the gaskets 17 and 18 made of India rubber, synthetic rubber or any other similar material. The stated arrangement of parts provides an airtight cavity 4a of prismatic shape, whose major walls 1a and 2a constitute the faces of the filter. In this form of construction (FIG. 6) there is provided between the transparent members 1a and 2, a transparent and rigid wedge 3a and the sliding of this wedge 3a varies the absorption value of the filter as has been already explained. The wedge 3a is shown in FIG. 6 as having been adjusted or wedged between the transparent members 1a and 2 a into the minimum absorption position of the filter.

As shown in FIG. 6, the transparent wedge 3a has formed therein a small channel 19 on its upper edge into which a wire 20 is lodged, which wire can be formed of silk, steel, or the like, and must be very flexible but not elastic. The wire 20 surrounds the transparent wedge 3a except on its lower side, and the ends of the same pass through holes 21 in the separator 5 and are fixed to an axle 22. When the axle 22 is rotated in one direction, the wire 20 rolls itself around on it, causing the transparent wedge 3a to descend or, what amount to the same, lowering the said wedge with respect to the transparent members 1a and 2a. When the axle 22 is rotated in the opposite direction, the transparent wedge remains free from traction and ascends, in response to pressure which the expansion springs 23 exercise on it. These expansion springs 23 piece the separating member 5 through the holes 24 formed in the separating member 5, said springs expanding or compressing themselves within the interior of the said holes 24 in a smooth way but without excessive clearances, in such a way that the aforementioned holes 24 serve as a guide for the springs 23, keeping them in through the correct position.

The axle 22 extends laterally of the filter through a bore in the extension 25 in which bore one or more gaskets 26 are lodged which compress the axle. These gaskets 26 may be made of rubber, synthetic rubber or any other compressible material. The purpose of these gaskets 26 is to prevent escape of fluid through the bore through which the axle 22 passes and, at the same time, to establish a sufficient degree of friction to prevent the pressure exercised by the springs 23 from modifying the position of the wedge 3a involuntarily. Finally, fixed on the projecting end of the axle 22, is a knob 27 which upon rotation regulates the optical density of the filter, it being possible, if desired, to gauge it in absorption units. The control mechanism is provided with means to limit the rotary movement of the knob 27 between the position of the wedge corresponding to minimum absorption and that corresponding to maximum absorption. The means in FIG. 6 takes the form of a lug 28 situated on the frame, and a stop 29 which forms part of the control knob 27.

In FIG. 6 the volumetrical expansion variations are absorbed by means of the flexible or elastic bladder 30, lodged in the cavity provided to contain the control elements. The entire interior of the cavity of the filter, not occupied by the wedge 3a, the bladder 30 and the control elements, is completely full in this modification, as in all others, with filtering fluid, which is introduced into the interior of the filter through the hole 31 which is afterwards closed by means of the screw 32. The modification shown in FIG. 6 is applicable to constructions of the filter having large dimensions, for which reason it is desirable that the wedge 3a be made of polymetiemetacrylate, or any acrylic resin, etoxylinic, polyester, or the like, so that the weight of this wedge 3a will be minimum, because otherwise the expansion springs 23 would have to exert considerable effort. This effort would also be applicable in operating the control knob 27 when it is desired to release the wedge 3a. The aforementioned resins, and some others, possess sufficient hardness and transparency to be able to satisfy technical necessities inherent to the wedge 3a.

Figure 7:
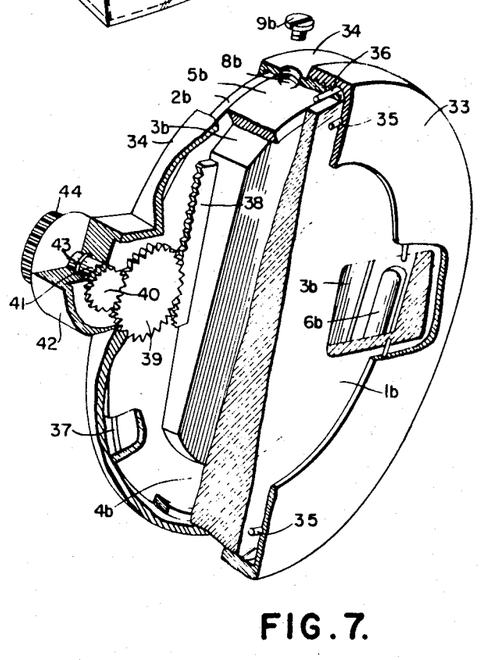
FIG. 7 is a fragmented perspective view of a further modification of the filter for optical applications.

When the construction of the filter is of reduced dimensions, the control system for positioning the wedge 3 can be simpler. In FIG. 7 a modification is shown of a small filter for optical applications, cinematography, television, or the like. This filter, in accordance with my invention, consists of the basic characteristic components of the system, that is, of the transparent members 1b and 2b which constitute the faces of the filter, and a sliding wedge 3b whose position regulates the absorption value of the filter, also a separator 5b which establishes the cavity 4b where the wedge 3b is movably lodged, also a bladder 6b to absorb the variations of volumetrical expansion of the liquid, also the hole 8b for the filling of the filter, and the screw 9b which hermetically closes this hole. The ensemble is fixed and kept in its correct position by means of the surrounding rings 33 and 34 which are threaded into each other, and establish pressure on the components of the filter and assure the airtightness on compressing the gaskets 35, 36 and 37.

In FIG. 7, fixed to a side of the wedge 3b, is a rack 38 as can be seen in FIG. 7 and meshing with the rack 38 is a cogwheel 39 with which a pinion 40 intermeshes. Fixed to the pinion 40 is an axle 41 which is rotatable in the bore of an enlargement 42. In order to prevent any fluid leakage, the gasket 43 has been provided, which places pressure on the axle 41 and the bore of the enlargement 42. Lastly, on the axle 41 is fixed a control knob 44 which, in this type of filter for optical applications, is usually gauged in absorption units. The wedge is thus moved in this modification of filter construction when the pinion 40 is rotated, and the limit of travel of the wedge 3b is the limit determined by the separator 5b.

Figure 8:
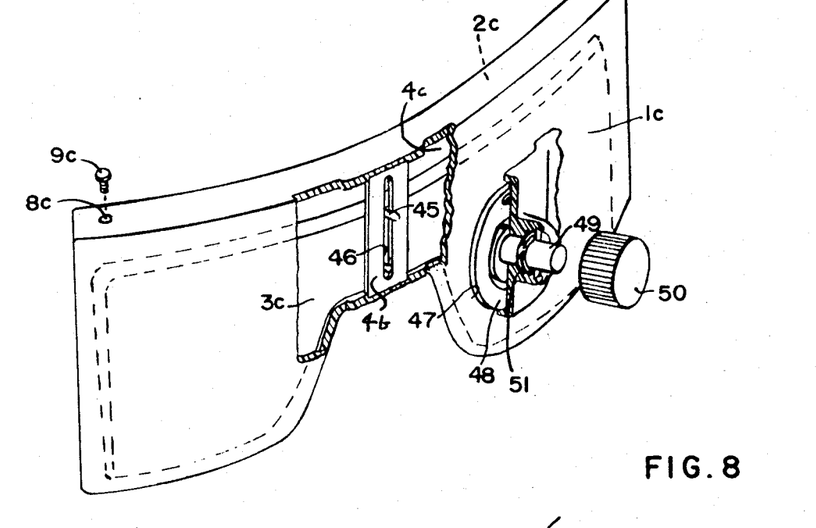
FIG. 8 is a fragmented perspective view of a still further modification of the filter, applicable to spectacles.

Among the numerous applications of the system, according to my invention, is the protection of spectacles. In FIG. 8 a partial perspective view is represented of a modification of the filter for a type of spectacle. In this figure some components of the assembly have been omitted in order to simplify the drawing and to give greater clarity to the control elements. In this modification, as in all others, the filter consists of the transparent members 1c and 2c which constitute the faces of the spectacles. Between the transparent members 1c and 2c is the sliding and transparent wedge 3c. The wedge 3c is common to the two lenses and, as can be seen in the drawing, is built in only one piece. In this form of execution, the omission has been made, as can be seen, of the separator and the bladder which, in the previous construction examples, served to absorb the volumetrical expansion variations of the fluid. The separator is not necessary provided the lenses of the spectacles and their edges are formed of the same material, as in the example of the simplified construction shown in FIGS. 1 and 2, forming a casing whose two halves are adhered together by means of any adequate adhesive. The dimensions of these two halves are conveniently provided so that once joined to each other, the wedge may lodge itself between them with the necessary clearance. The bladder has been omitted since only a small amount of fluid is lodged in the cavity 4c with respect to the relatively large dimension of the spectacle, and since the volumetrical expansions of the fluid due to temperative variations will be absorbed by the flexing of the material which constitutes the spectacles.

In FIG. 8, the wedge 3c common to the two lenses of the spectacle, has a pin 45 on its central part which engages the vertical guide slot 46 and also engages the spiral channel 47 of a cam wheel 48. This wheel 48 is integral with an axle 49 which carries a control knob 50. The ensemble, wheel 48, axle 49 and control knob 50 have been represented in the drawing separated from their correct position, but in the assembly of the ensemble, the wheel 48 will rub against the guide piece 4b in such a way that the pin 45, on piercing the guide slot 46, immediately introduces itself into the spiral 47. The dimensions and position of the spiral 47 are so formed that at one end of its travel it may make the wedge 3c descend to its position of minimum absorption, as is shown in FIG. 8, and, when reaching the opposite end of its travel, will make the wedge 3c ascend to its position of maximum absorption, that is, when the upper part of the wedge 3c meets its limit at the upper part of the cavity 4c. As is logical, the axle 49 will pierce a hole or bearing in the mounting surface 1c of the spectacles in which there is a gasket 51 similar to those illustrated in the previous modifications. The cavity 4c is filled with filtering fluid by means of the hole 8c which is hermetically closed by means of the screw 9c. The filtering fluid has been omitted in the drawings (FIG. 8) for greater clarity, but as has been previously stated, this fluid completely fills the interior of the filter.

Figure 9:
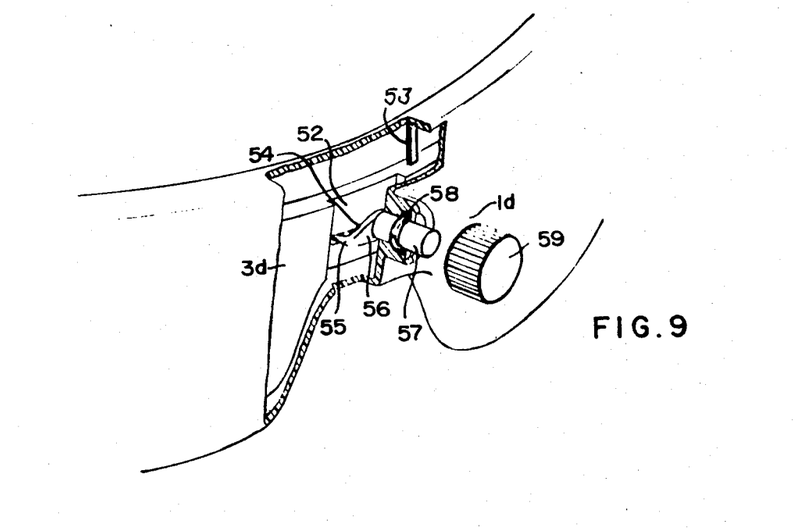
FIG. 9 is a view, similar to that the FIG. 8 showing an alternative adjustment means.

In FIG. 9, there is shown an alternative arrangement of spectacle similar to that of FIG. 8, wherein the wedge 3d is also common to both lenses of the spectacle, but in this instance the central portion of the wedge (which might be formed of a single piece of transparent plastic material) is provided with a vertically extending channel portion, indicated by numeral 52, for slidable engagement with a guide means which may include a pair of vertically positioned members 53, only one of which is shown in the drawing. Within the recessed portion of the wedge there is also provided a horizontally extending slot 54 which is engageable with the laterally projecting end portion 55 of an arm 56, secured to the inner end of a shaft 57 pivotally mounted in the front wall of the cover 1d. The shaft is provided with a sealing means, such as the O-ring 58, and may be provided with a knob 59 at its projecting end. As in the other modifications, the entire cavity within the cover 1d is filled with a light filtering fluid and rotation of the knob 59, which turns the shaft 57, will move wedge 3d vertically in either direction to alter the light filtering characteristics of the spectacles.

Figure 10:
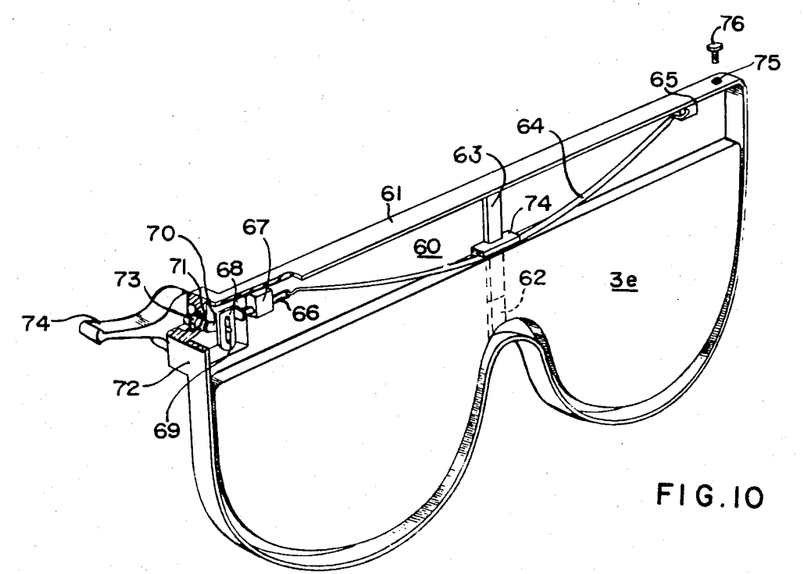
FIG. 10 is a fragmented perspective view of another modification of the filter, having a quick-acting control mechanism.

In FIG. 10 there is shown a modified form of spectacles or goggles, of simplified construction having an adjustment means for quickly shifting the position of the prismatic member. In one form of the invention the main portion of the spectacle may be formed from two pieces of transparent material, one of which includes the transparent exterior wall 60 having an integrally formed flange 61 extending along the entire periphery thereof to serve as a spacer to which another flat piece of transparent material (not shown) may be secured to provide the cavity within which the slidable transparent wedge 3e is contained. In this instance the wedge, or prismatic element, may be also provided with a vertically extending recessed portion 62 for slidably engaging a vertical guide element 63 secured to the inner portion of the upper flange 61.

The adjustment means for the prismatic member includes a transversely extending flat resilient ribbon 64, which may be formed of spring steel or other similar material. One end of this ribbon is anchored to a mounting element 65, also secured to the lower portion of the flange 61, while the other end of the ribbon is connected with a pin 66 which is slidably mounted for horizontal movement in a mounting element 67. The other end of the pin is provided with a flattened head portion 68 having a vertically extending slot 69 provided therein.

This slotted portion is in engagement with the projecting portion of a small crank arm 70 secured to the inner end of a shaft 71 rotatably mounted in a reinforced portion 72 of the enclosure 60. The shaft is also provided with sealing means, such as the O-ring 73, while the projecting end of the shaft is provided with a control lever 74. As a result of this arrangement it will be obvious that rotation of the knob 74 will cause a corresponding flexing of the ribbon, or spring member 64 and a consequent vertical movement the wedge 3e. In order to assure positive movement of the wedge by the ribbon 64 there may be provided a means such as the connecting strip 74 secured to the midpoint of the wedge, or integrally formed therewith, which connecting strip overlies the midpoint of the ribbon. As in the other forms of the invention when the enclosure is sealed by the addition of the other transparent exterior wall the cavity formed thereby may be filled with a light modifying liquid through the opening 75 in the flange of the enclosure, and sealed by means of the screw 76.

Figure 11:
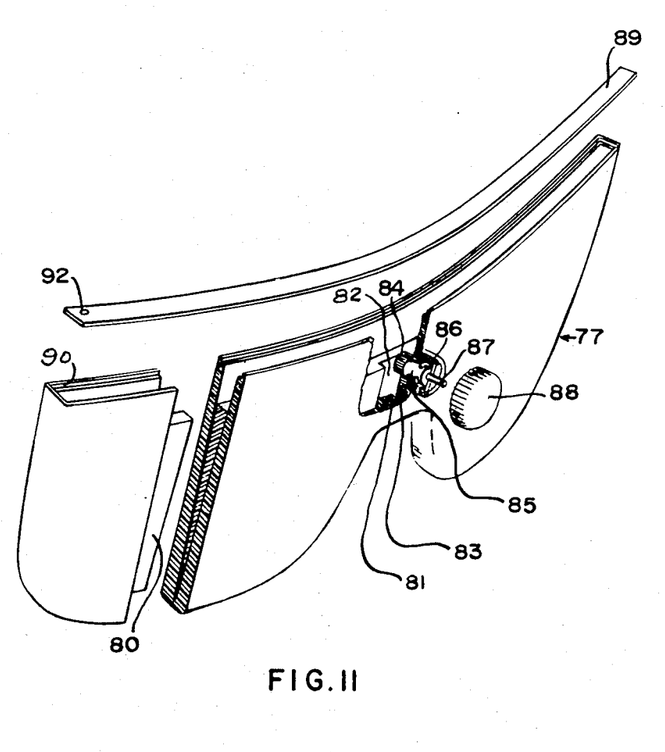
FIG. 11 is a fragmented perspective view of still another modified form of filter for spectacles capable of being fabricated from molded components.
Figure 12:
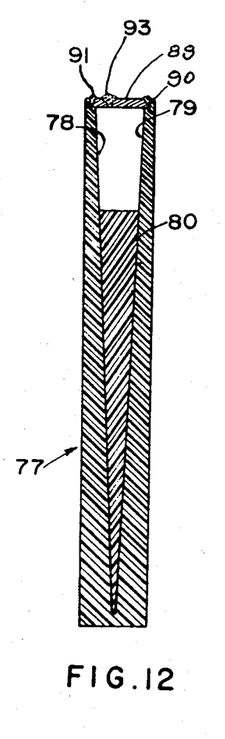
FIG. 12 is a vertical cross section of one of the eyepieces of the device shown in FIG. 11.

The form of the invention disclosed in FIGS. 11 and 12 is one in which all of the elements of the device may be produced by means of injection molding. In this instance the enclosure, indicated generally by numeral 77, comprises an elongated strip of transparent plastic material whose interior is recessed to provide a cavity whose inner surfaces 78 and 79 are arranged on an acute angle with respect to each other to receive the vertically slidably element or wedge 80 whose opposite surfaces are formed to correspond with the angle of the inner walls 78 and 79 of the enclosure 77, but whose height is somewhat less than the entire depth of the cavity. Also, as can be seen in FIG. 11, the central portion of one wall of the enclosure may be molded with an integrally formed vertically extending guideway 81 which will slidably engage with a similar vertically extending recessed portion 82 formed in the wedge. One sidewall of this recess may be formed with a series of teeth 83 for engagement with a small pinion 84 which may have formed integrally therewith a shaft portion 85 for rotatable mounting in one of the walls of the enclosure in sealing engagements therewith by means of the O-ring 86. Furthermore, the shaft 85 may have a further extension of reduced diameter 87 to which may be secured the control knob 88. Finally, as may be seen in FIG. 12, the top of the enclosure can be closed by means of a horizontally extending flat strip 89 which may be seat flush with the top of the enclosure in a channel 90 extending around the inner portion of the upper end of the enclosure and permanently secured thereto, as by means of an adhesive, indicated by numeral 91. In addition, after the device has been assembled the entire cavity may be filled with a suitable filtering liquid through an opening 92 provided in the cover strip 89 and this opening can be sealed by a removable threaded screw, or by means of adhesive, indicated by numeral 93. In any case, it is important to insure that all of the gas, or air, has been removed from the liquid in the cavity before the opening is sealed.

Figure 13:
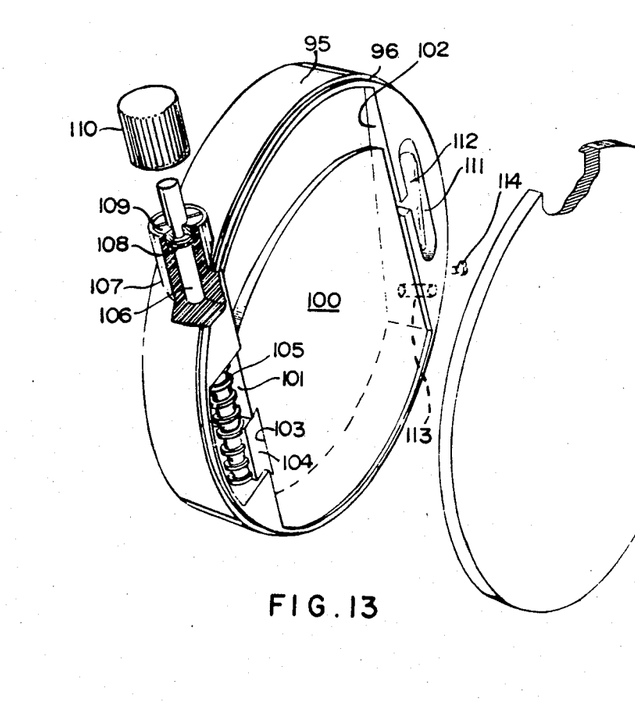
FIG. 13 is an exploded view, partly in section of another form of optical filter incorporating an adjustment means similar to that of FIGS. 1 and 2.
Figure 14:
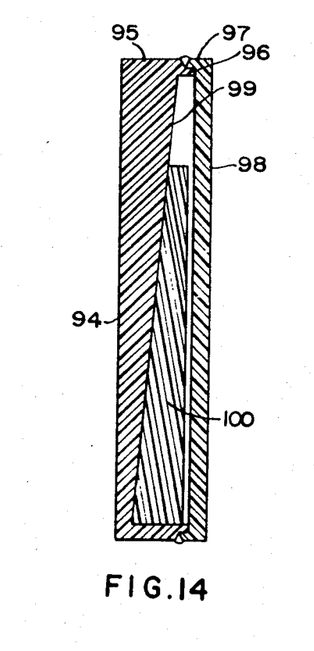
FIG. 14 is a cross section of the device of FIG. 13.

FIGS. 13 and 14 illustrate a form of the invention which provides an inexpensive type of optical filter which also is capable of being produced by injection molding of the component parts thereof. In this instance the main body of the enclosure may comply a circular chamber made from suitable transparent plastic material and having a flat surface 94 with an integrally formed circular rim portion 95, the exterior edge of this run being provided with an annular channel 96 for engagement with the flange portion 97 of a circular cover 98. In this form of the invention, the opposed exterior surfaces of the cover and chamber may be parallel while the inner surface 99 of the chamber facing the cover will be formed at an acute angle therewith. Therefore, the transparent wedge 100 will have a cross section whose surfaces correspond to the inner face of the cover and the inner surface of the container, as shown in FIG. 14.

While the upper and lower margins of the wedge are generally circular to conform with the shape of the enclosure, it has flat parallel side faces 101 for slidable engagement with the parallel interior sidewalls 102 formed in the interior of the enclosure. In addition, one of the sidewalls of the wedge may be provided with an undercut transversely extending recess 103 into which is fitted an insert 104, which may be made of nylon, Teflon, or other wear resistant material, this insert being provided on its outer exposed surface with a series cavity spaced arcuate groves arranged for operative engagement with the helical threads 105 provided at the lower end of a shaft 106 which projects upwardly through an extension 107 formed in the rim of the enclosure. This shaft may be sealed by an annular resilient ring 108, which may be maintained under pressure by means of a threaded ring 109 surrounding the upper end of the shaft, and the upper end of the shaft may be provided with an operating knob 110.

In this form of the invention, there may also be provided a small chamber 111 in communication with the remainder of the cavity in the enclosure and, contained within this chamber is a small resilient bladder 112, for the purpose of compensating the volumetrical changes in the fluid caused by temperature variations. The cavity and chamber may be filled with light filtering fluid by means of a passable 113 which is sealed by means of a screw 114.

Figure 15:
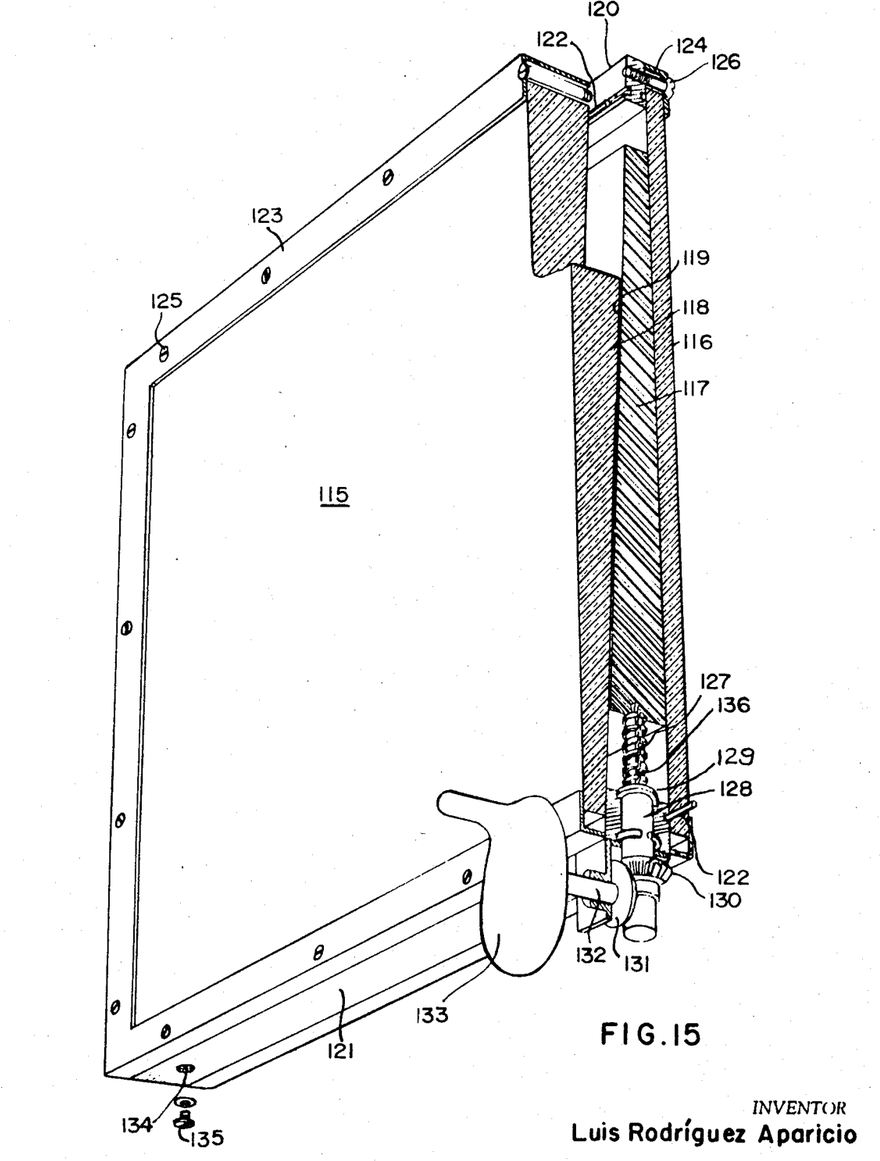
FIG. 15 is a prospective view, partly in section of another form of filter for rectangular openings of large size.

FIG. 15 illustrates a form of the invention which is particularly suitable for installation in a large opening such as a so-called picture window in a residential building, although it is suitable for use in any size opening. Essentially, this form of the invention includes transparent exterior panes 115 and 116 with a transparent prismatic member, or wedge shaped, element 117 positioned between them. While it is entirely feasible to make the exterior panes with both of their interior surfaces making an angle with their respective exterior surfaces, in some cases it may be more practical to use one pane having parallel faces as indicated by the pane 116 in FIG. 15. In this case, the interior surface 118 of the pane 115 may be disposed at an acute angle with respect to the exterior surface, this angle being the same as the angle which the surface 119 of the wedge makes with its opposite surface. In other words, the transverse section of the pane 115 may be the same as the transverse section of the wedge, the two sections being disposed in opposite relation to each other. In the case of an ordinary window, where optical precision is not of prime importance, both of the panes 115 and 116 may be made of conventional plate glass of uniform thickness, so long as the interior surface of one of the panes and at least one surface of the prismatic element 117 are arranged generally parallel to each other and at an acute angle with respect to the linear path of movement of element 117. The panes 115 and 116 are positioned with respect to each other by means of a separating member which is shown in FIG. 15 as having an upper section 120 which is thinner than the lower section 121 due to the difference in the thickness of the element 117 at its upper and lower margins. This separator encircles the member 117 and extends along the entire margin of each of the panes 115 and 116 and is provided with longitudinally extending recesses on opposite sides in which are disposed resilient sealing strips, indicated by numeral 122, which strips are of a thickness to project outwardly beyond the separator to enable adjustment of the spacing between the outer transparent members of the window. In addition, peripheral L-shaped channel members 123 and 124 preferably made of metal, extend around the margin of the two transparent panes. Channel member 123 is provided with a series of openings to receive adjusting screws 125 at spaced intervals which are received within suitable openings provided in the separator member for holding pane 115 in place. Similarly, the channel member 124 is provided with openings to receive adjusting screws 126 for securing the pane 116 to the separator member. In this connection it will be noted that the rectangular frame formed by the channel members may be slightly larger in overall dimensions than the transparent panes, thus permitting the adjusting screws to pass directly into the separator rather than through suitable openings in the panes. While a frame encircling the margins of the exterior panes 115 and 116 has been shown in the drawings, it is also possible to employ a series of individual adjustable clamps spaced at intervals for this purpose. It would be also possible to secure the spacer to one or the other of the exterior panes by means of a suitable adhesive. The adjusting means for moving the prismatic member 117 includes a threaded member 127 attached to the lower edge of the member 117, and received within a tubular element 128 rotatably supported in the lower separator 121 and having a radial flange 129 at its upper end to prevent its displacement in an axial direction. In order to provided sufficient force to move a member of large size, a reduction gear arrangement may be provided comprising a bevel gear 130 surrounding the lower end of the rotary element 128 arranged for meshing with another bevel gear 131 which, in turn, is attached to a shaft 132 suitably supported in a bracket attached to the separator and having a control knob 133. As in the other forms of the invention the entire space between the transparent members 115 and 116 forms a portion of a cavity into which a light filtering fluid may be introduced as by means of an opening 134 having a sealing screw 135 at the lower portion of the assembly. An additional opening and sealing screw can be located in the upper separator, if necessary, in view of the fact that it is essentially that when liquids are used as the filtering medium all air bubbles must be removed from the system. In this connection, as well as in connection with modification shown in FIGS. 1 and 2, the cavity to be filled will include the portion of the interior of the rotatable tubular element 128. When, the element 127 is moved into the upper position, as shown in FIG. 13, this movement displaces liquid and causes said displaced liquid to move downwardly into the space vacated by the threaded element with the tube 128. In the form of the invention shown in FIGS. 1 and 2 the liquid could leak past the threads of the cooperating threaded elements, particularly in view of the small size in that instance. However, where the size of the adjusting element is large, it may be preferable to provide a means for facilitating this transfer of the fluid, in which case, it is only necessary to provide the longitudinally extending groove 136 in the threaded element 127 to facilitate this operation.

The filtering fluid can be selected from a great variety of materials, depending on the use to which the filter is applied. Although gas may be used, the use of a liquid has been found much more practical and its behavior more stable. This liquid must behave in a practically stable manner between the maximum and minimum temperature at which the filter has to work. AS examples of liquids I recommend for use in the filter, mention is made of alcohols, especially ethylic and amylic; the glycols, especially ethyleneglycol, the hydrocarbons, especially petroleum, benzine, paraffin, etc., or also mixtures of these and other liquids which may satisfy the demands of stability, viscosity, vapor tension, volumetrical expansion, etc. The selected filtering fluid must not produce any chemical reaction on the interior surfaces of the filter with which it is in contact, or these surfaces must be protected with a neutral material, or the materials used in the construction of the filter must be those which may keep the stability and cleanliness of the filtering fluid.

Coloring materials perfectly dissolved in the same can be used to color the liquid. The color and concentration of the coloring will depend on the application and maximum absorption degree which one wishes the filter to possess. The blue-black coloring have shown themselves to be very suitable for application on protection screens, and spectacles, and for windows.

The variable light filter, according to my invention, is capable of being adapted to a great variety of applications. It can be permanently installed or used in an associated way on windows of any kink of vehicle, cars, trains, airplanes, ships, buildings, etc. It can also be applied in a form for protecting spectacles and antiglare ones, in photography, observation apparatus, finders, television cameras and in any kind of optical instrument where a predetermined color is needed. By using two or more filters in tandem, in one single assembly, it is possible to obtain not only variability in their optical density but equally in their spectral characteristic, new and enormous possibilities being achieved with my filter in the field of spectrometry, in the projection of light, and in optics in general.

The invention is not limited, as can be easily understood, to the variable filtration of visible light, since by using an adequate filtering fluid it can equally be applied for the regulation of radiations situated above and below the visible spectrum, as well as for the variable filtering of particles from the atomic structures.

The details of my variable filter, according to my present invention, can be varied at will. For example, it should be obvious that any of the various mechanical motion transmitting mechanisms shown for moving the prismatic member can be substituted one for the other by making suitable changes which would be obvious to one skilled in the art. The forms and assembly of the structures or frames shown in the drawings are merely illustrative, and the mechanical means to regulate the positions of the sliding wedge is susceptible of a great variety of modifications and equivalents which would come within the scope of the annexed claims.

I claim:

1. A variable light filter comprising a casing having an airtight cavity therein, a portion of said cavity being defined by a pair of opposed fixed rigid transparent walls whose inner surfaces make an acute angle with each other, a rigid transparent member of prismatic shape having opposed surfaces conforming generally with said inner walls of the cavity and adjustment means having a movable control element positioned exteriorly of the cavity, said adjustment means including a body extending through an aperture provided in a wall of said cavity, and sealed rotary support means to position said body for rotary movement relative to said wall, said body being operatively connected between said control element and the prismatic-shaped member for reciprocatorily moving said prismatic member is a linear path in response to rotation of said control element for varying the space between the surfaces of the prismatic member and the adjacent transparent walls of the cavity, the remainder of the space in said cavity being completely filled with a light-modifying fluid, the volume of fluid displaced by said prismatic-shaped member and that part of said adjustment means which is within the cavity connected with the prismatic member for said reciprocatory movement having a constant value in all positions of the prismatic-shaped member.

2. An invention as defined in claim 1, wherein said adjustment means includes a pair of telescopically arranged elements in threaded engagement with each other, one of said pair of elements being rotatably mounted in axially fixed relation to the pair of opposed fixed transparent members, and one of said telescopically arranged elements being provided with a longitudinally extending groove to assist in the transfer of fluid displaced by relative axial movement of the other element.

3. An invention as defined in claim 1, wherein said rotatable element of the adjustment means includes a gear pinion, and said prismatic member includes a plurality of linearly arranged teeth for operative engagement with said gear pinion.

4. An invention as defined in claim 1, wherein said adjustment means includes cam means rotatably mounted in fixed relation to said opposed fixed rigid transparent walls, a follower element comprising a pin projecting laterally of the prismatic member is connected with the prismatic member for operative engagement with said cam means, and said cavity is provided with a guide element having a slotted opening for engagement with said pin.

5. An invention as defined in claim 1, wherein said adjustment means includes a longitudinally extending laterally flexible longitudinally inextensible element, arcuately disposed generally transverse to the direction of movement of the prismatic member, one end of said flexible element being anchored with respect to the cavity, the other end of said flexible element including an element slidably mounted in the cavity having a slot formed therein transverse to the length of the flexible element, and means for connecting said other end of the flexible element for movement with respect to the cavity in said transverse direction for alternating the position of a medial point of said flexible element said means for connecting including a shaft rotatably mounted in the cavity and operatively connected with the flexible element, said rotary shaft including a crank element engaged with said slot.

6. An invention as defined in claim 1, wherein said casing is formed by a pair of transparent elements, one of said pair of elements being generally elongated and shaped for use as spectacles, said one element being open at the top, the other of said pair of elements comprising an elongated flat strip for closing the open top of said one element.

7. An invention as defined in claim 1, said casing being formed by a pair of transparent elements, one of said pair of elements being generally cylindrical having one end open, the other of said pair of elements comprising a flat disc for closing the open end of said one element said prismatic member having flat parallel side portions and one element of the pair of elements forming the casing including interiorly disposed parallel flat portions for slidable engagement with the side portions of the prismatic member.

8. An invention as defined in claim 7, wherein said adjustment means includes a plurality of linearly arranged teeth attached to the prismatic member, and gear means are attached to said rotatable control element engageable with said teeth.

9. An invention as defined in claim 8 wherein said gear means includes a helically threaded member.